United States Patent [19]
Truesdell

[11] Patent Number: 5,403,132
[45] Date of Patent: Apr. 4, 1995

[54] QUICK REPLACEMENT TOOLHOLDER FOR MILLING MACHINE

[76] Inventor: Thomas B. Truesdell, 14010 Shadowoaks Wy, Saratoga, Calif. 95070

[21] Appl. No.: 249,940

[22] Filed: May 27, 1994

[51] Int. Cl.⁶ ............................................. B23C 5/26
[52] U.S. Cl. ............................... 409/131; 279/145; 408/239 A; 409/233
[58] Field of Search ................ 483/55, 56; 409/232, 409/233, 234; 279/46.6, 143, 144, 145, 83; 408/239 A, 240, 226; 82/160, 158

[56] References Cited

U.S. PATENT DOCUMENTS

| | | | |
|---|---|---|---|
| 1,765,362 | 6/1930 | Berry | 279/145 X |
| 2,576,350 | 11/1951 | Mazzola | 279/145 X |
| 3,411,796 | 11/1968 | Decker | 279/145 X |
| 4,175,898 | 11/1979 | Wood | 409/233 |
| 4,810,139 | 3/1989 | Regan | 408/239 A |
| 5,067,861 | 11/1991 | Danielsen | 409/234 |

FOREIGN PATENT DOCUMENTS 2358948  2/1978  France ................... 279/143

Primary Examiner—Z. R. Bilinsky
Attorney, Agent, or Firm—Robert Samuel Smith

[57] ABSTRACT

A toolholder for securing a tool in the collet of a mill, the collet having a fluted open end wherein the toolholder is a pair of concentrically arranged cylinders, one cylinder inside the other and each having flutes. The inner cylinder has an axial bore for receiving the shank off the tool so that the flared end of the spindle squeezes the fluted ends of the pair of cylinders and the shank of the tool so as to secure the shank of the tool concentric with the collet and spindle of the mill.

6 Claims, 1 Drawing Sheet

QUICK REPLACEMENT TOOLHOLDER FOR MILLING MACHINE

BACKGROUND

1. Field of the Invention

This invention is related to devices for holding milling cutters (tools) in mills and particularly to a toolholder that enables a user to make a quick and convenient substitution of tools without removing the collets.

2. Background and Information Disclosure

A mill for cutting a metal part including a vise to hold the part and means to move the vise and part in three dimensions while machining (cutting) the part with a rotating tool has been in widespread use for almost a century. One particular manufacturer has been so successful in marketing a version of this machine that the machine is universally referred to as the "Bridgeport mill" although there are numerous other manufacturers all producing an identical machine.

The toolholder used in the Bridgeport mill is a collet with a bore having a thread on one end. The collet slips into the bottom end of the bore of a rotatable spindle. A drawbar inserted into the top of the spindle is screwed into the end of the collet and draws the collet into the bore of the spindle. The shank of a tool is positioned in the bottom end of the collet. The collet has three slits along the shank of the tool so that as the low end of the drawbar is screwed into the top end of the collet thereby drawing the collet into the bore of the spindle, the lower end of the collet is squeezed in the flared end of the bore of the spindle so as to clamp onto the tool. This construction provides very solid support to the shank of the tool This is an important requirement in order to avoid vibration which would occur as the tool cuts the metal and cause degradation of the finish of the surface of the part. The fluted construction of the collet with slots also maintains very accurate concentricity of the shank of the tool with the rotational axis of spindle. This is necessary for achieving good finish and precision and is the arrangement that has been used by millions of machinists over a period of fifty years.

A major inconvenience with this arrangement is that the machinist must change his toolbits frequently, inserting larger or smaller tools or he may be required to insert a drill bit requiring that an expandable chuck with a straight shank be mounted in the spindle. Changing one tool to another tool having a different shank diameter also requires that he must change one collet to another collet having an appropriate bore to fit the diameter of the shank. This involves the time consuming operation of separating (by unscrewing) the drawbar from the top end of the collet, removing the collet from the bore of the spindle, searching for the collet having the appropriate bore diameter to fit the shank of another tool, inserting the second collet back into the bore of the spindle, screwing the drawbar back onto the end of the newly mounted collet. Because the collet universally used for this operation is typically eight inches long, the machinist must usually operate the crank handles of the mill to move the vise and part down and away from the end of the spindle in order to remove one collet and insert another collet. This causes loss of registration of the part with the tool bit and consequently loss of accuracy in machining the part. Typically, the requirement to change collets in machining a pan extends the time required to machine the part by about 50%.

Another problem with this arrangement is that the machinist must have available a number of expensive collets, each collet having a bore diameter different from the bore diameters of the other collets such that there is one collet for every shank size of the machinist's collection of toolbits. This requires a considerable cost to the machinists because each collet is precision machined and has a taper on an outside surface, a thread in one end, a precision bore, axial slots that allow the collet to squeeze onto the end of the shank, and the holder must be machined from hardened steel in order to extend the life of the threads formed in the bore.

Because of the expense of the collet, the typical machinist generally has only one collet per shank diameter and therefore has a limited number of collets. Therefore, he typically maintains his tools in a place separate from where he stores his collection of collets. The result is further loss of time in sorting through his collection of collets and collection of cutters in order to match the collet with the cutter.

THE INVENTION

Objects

It is therefore an object of this invention to provide a toolholder which secures the cutter to the spindle of and reduces the time consuming operation of replacing BOTH the collet and tool when a new size of tool is required.

It is another object that the tool of this invention hold the tool very securely such as to avoid vibration generated by the tool rotating against the part.

It is another object to eliminate the cost that is inccured by requiring a number of collets having a range of bores to accommodate all sizes of tools.

Summary

This invention is directed toward a toolholder which has one end adapted to receive the shank of a tool and another end adapted for securing in a mill. The toolholder is basically a double collet. An inner collet holds the shank of the tool and is positioned inside an outer collet which is engaged in the spindle of the mill. This construction provides a stable support for the tool and maintains precise alignment of the axis of the tool with the axis of the spindle while enabling the operator to change tools quickly and conveniently by simply disengaging the inner collet from the outer collet. The tool end of the inner collet extends from the outer collet and a collar slips over the extended end of the inner collet. The collar is collapsible by virtue of a slot and set screw in the collar so that the shank of the tool is secured in the inner collet when the inner collet is not positioned in the outer collet. The collar also functions as a stop which provides for inserting each inner collet a repeatable distance into the outer collet

DESCRIPTION OF A PREFERRED EMBODIMENT

Figure 1:
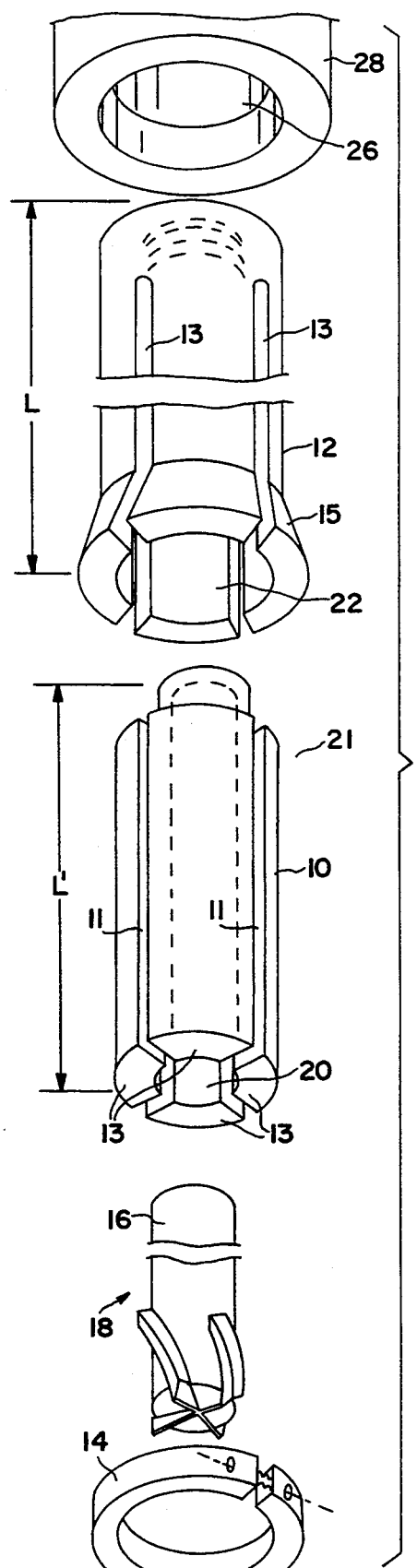
FIG. 1 shows an exploded view of the toolholder of this invention.
Figure 2:
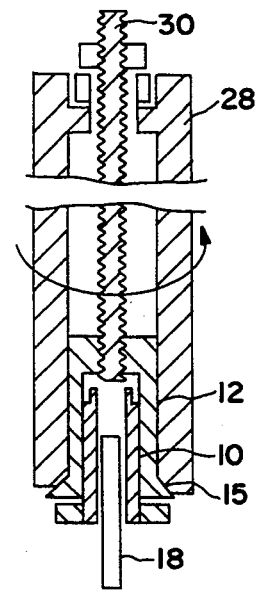
FIG. 2 shows the toolholder in the mill spindle.

Turning now to a discussion of the drawings, FIG. 1 shows an exploded view of the toolholder of this invention including an outer cylinder 12, an inner cylinder 10 and a retaining collar 14 FIG. 2 is a sectional view of the assembled toolholder positioned in the bore 26 of the spindle 28 of the mill, (mill not shown).

The inner cylinder 10 has flutes formed by slots 11 (four slots are shown) extending from the lower end of the inner cylinder 10. The outer cylinder 12 also has flutes formed by slots 13. The lower end of the outer cylinder 12 has a taper 15.

The shank 16 of a tool 18 fits into the bore 20 of inner cylinder 10 and is held securely by collar 14 slipping onto the end of inner cylinder 10. The upper end 21 of the inner cylinder 10 slips into the bore 22 of the outer cylinder 12. The outer cylinder 12 slips into the bore 26 of the mill spindle 28. As shown in FIG. 2, a drawbar 30 extends down through the spindle 28 and screws into the threaded end of bore 22 of the outer cylinder 12, such as to draw the toolholder into the bore 26 of spindle 28 causing the outer cylinder to be squeezed onto the inner cylinder 10 and shank 16 of the tool by virtue of the taper 15 and the fluted construction of the inner cylinder 10 and outer cylinder 12.

Figure 4:
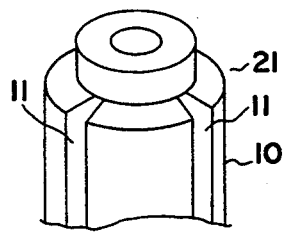
FIG. 4 shows details of the shoulder of the inner cylinder.

FIG. 4 shows in greater detail the construction of the upper end of the inner cylinder 10. The inner cylinder 10 has a shoulder 21 on the circumferential corner of the inner cylinder 10 opposite the tool and the slots 11 of the inner cylinder 10 extend from the tool end of the inner cylinder 10 to the shoulder 21. This construction improves the purchase of the inner cylinder 10 by reducing the resistance to squeezing the flutes 13 of the inner cylinder 10 against the shank 16 of the tool.

Figure 3:
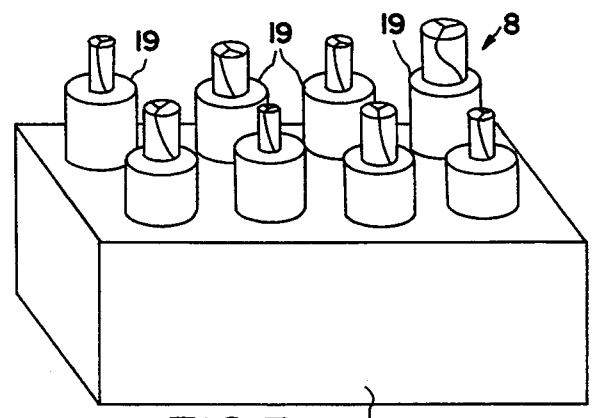
FIG. 3 shows a nest of the tool holders and tools of the present invention.

FIG. 3 shows a nest of toolholders 19 in block 32 and illustrates the convenience of using the invention. For many machine shops, a useful dimension of bore 22 of outer cylinder 12 is ¾ inch FIG. 3 illustrates toolholders 19 with tools having shanks ranging from 1/16 inch to 11/16 inch in steps of 1/16 inch. A useful dimension of bore 22 of outer cylinder 12 is ¾ inch so that each toolholder in the nest has an outer diameter of ¾ inch. Tools shown in FIG. 3 may have shanks ranging from 1/16 inch to 11/16 inch in steps of 1/16 inch. The machinist may change each tool to run his job simply by loosening the drawbar 30 and inserting the inner cylinder 10 with required tool 18 selected from the nest of tools shown in FIG. 3.

A major feature of this invention is the combination of inner and outer cylinders which provides very accurate alignment of the tool 18 with the spindle 28 while providing quick change of tools by simply slipping one inner cylinder 10 with tool 18 out of the outer cylinder 12 and inserting another inner cylinder 10. The inner cylinders may be much shorter than the outer collet. A length, L' (FIG. 1) in the range from 1.0 inch to 3.5 inches is a very practical length for the inner cylinder 10 and a length L in the range from 7 to 9 inches is a useful length L for the outer cylinder 12 corresponding to a maximum ratio, L/L' of 9 and a minimum ratio L/L' of 2. so that there is no necessity to drop the mill table or crank the part away from the tool in order to replace the short inner cylinder 10 as required when replacing an eight inch collet of the prior art. By virtue of this arrangement, the operator can maintain a store of inner cylinders 10 holding tools having a range of sizes, enabling him to quickly select the required tool for installment in the mill. The inner cylinder 10 is much less expensive than the collet of the prior art because it requires less material and because there is not a requirement to machine a precision taper on the side of the inner cylinder. According to an object of the present invention, the machinist need invest in only one outer cylinder 12 and a nest of inexpensive inner cylinders 10.

A steel alloy is the preferred material for fabrication of the toolholder. However, other alloys may be useful depending on the application.

Variations to the toolholder of this invention may occur after reading the specification and studying the drawings. I therefore wish to define the scope of my invention by the appended claims.

I claim:

1. A method for removably securing a shank of a tool in a spindle of a mill, said spindle having a bore with a flared opening, said method including the steps performed in random order:

(a) inserting an outer cylinder of a toolholder in said flared opening of said bore of said spindle wherein said toolholder comprises:

(i) an inner cylinder having an axial first bore, said first bore having an opening at a first end of said inner cylinder and another opening at a second end of said inner cylinder;

(ii) said inner cylinder adapted for having a shank of said tool inserted into said bore at said first end of said inner cylinder;

(iii) said inner cylinder having a plurality of slots extending from said first end toward said second end of said inner cylinder thereby defining a plurality of flutes extending from said first end of said inner cylinder;

(iv) an outer cylinder having an axial second bore, said second bore extending from a first end of said outer cylinder to a second end of said outer cylinder;

(v) said second bore having an internal thread extending from said second end of said outer cylinder for a distance into said second bore and adapted to receive a threaded end of a drawbar positioned in said bore of said spindle;

(vi) said outer cylinder having a plurality of slots extending from said first end toward said second end of said outer cylinder thereby defining a plurality of flutes extending from said first end of said outer cylinder;

(vii) said inner and outer cylinders constructed in operable combination with one another and said tool and said spindle such that said shank of said tool is enabled to be secured in said spindle of said mill and positioned to machine a part;

(viii) a collar having a third bore which slip fits over said inner cylinder wherein said collar has a cut and a set screw such that said collier slipped over said inner cylinder is squeezed on said inner cylinder by turning said set screw;

(b) inserting said shank in said bore at said first end of said inner cylinder;

(c) inserting said second end of said inner cylinder in said first end of said outer cylinder;

(d) screwing a drawbar operably positioned in said spindle into said second end of said outer spindle such as to squeeze said inner cylinder and shank;

(e) inserting said inner cylinder into said collar;

(f) turning said set screw such as to squeeze said inner cylinder.

2. A toolholder for removably securing a tool in a mill, said mill having a rotatable spindle with a bore having a flared opening, said toolholder comprising;

an inner cylinder having an axial first bore, said first bore having a first end at a first end of said inner cylinder and a second end at a second end of said inner cylinder;

said inner cylinder adapted for having a shank of said tool inserted into said first end of said first bore;

said inner cylinder having a plurality of slots extending from said first end toward said second end of said inner cylinder thereby defining a plurality of flutes extending from said first end of said inner cylinder;

an outer cylinder having an axial second bore, said second bore extending from a first end of said outer cylinder to a second end of said outer cylinder;

said second bore having an internal thread extending from said second end of said outer cylinder for a distance into said second born and adapted to receive a threaded end of a drawbar when said outer cylinder is positioned in said flared end of said bore of said spindle and said drawbar is positioned in said bore of said spindle;

said outer cylinder having a plurality of slots extending from said first end of said outer cylinder toward said second end of said outer cylinder thereby defining a plurality of flutes extending from said first end of said outer cylinder;

said inner and outer cylinders constructed in operable combination with one another and said tool and said spindle such that with said shank of said tool inserted in said first end of said inner cylinder, said second end of said inner cylinder inserted in said first end of said outer spindle, said second end of said outer cylinder inserted into said flared end of said bore of said spindle and said drawbar positioned in said bore of said spindle and screwed into said second end of said outer cylinder, said tool is secured in said spindle of said mill and is positioned to machine a part;

a collar having a third bore which slip fits over said inner cylinder:

said collar having a cut and a set screw such that said collar slipped over said inner cylinder is squeezed on said inner cylinder by turning said set screw.

3. A toolholder as in claim 1 wherein said inner cylinder has a shoulder formed in an outside corner at said second end of said inner cylinder and said slots in said inner cylinder extend from said first end to said shoulder such as to enhance purchase of said inner cylinder on said shank of said tool.

4. A toolholder as in claim 2 wherein said inner cylinder has a length between 1 inch to 3.5 inches.

5. A toolholder as in claim 2 wherein said outer cylinder has a length between 7 and 9 inches.

6. A toolholder as in claim 2 where a ratio of a length of said outer cylinder divided b a length of said inner cylinder is in the range from a quantity 2 to a quantity 9.

* * * * *